US012315364B2

(12) United States Patent
Lin

(10) Patent No.: US 12,315,364 B2
(45) Date of Patent: May 27, 2025

(54) REMOTE CODING SETTING METHOD AND RECEIVER FOR A CEILING FAN

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 105 days.

(21) Appl. No.: 18/489,197

(22) Filed: Oct. 18, 2023

(65) Prior Publication Data

US 2025/0131817 A1 Apr. 24, 2025

(51) Int. Cl.
*G08C 17/02* (2006.01)
*F04D 27/00* (2006.01)

(52) U.S. Cl.
CPC ............. *G08C 17/02* (2013.01); *F04D 27/00* (2013.01)

(58) Field of Classification Search
CPC ........ G08C 17/02; G08C 19/28; G08C 23/04; G08C 2201/20; F04D 27/00; F04D 25/08; F04D 25/088; H04N 21/42204; H04N 21/47
See application file for complete search history.

(56) References Cited

U.S. PATENT DOCUMENTS 4,385,296 A * 5/1983 Tsubaki ................. G08C 19/28 318/16
5,386,251 A * 1/1995 Movshovich .......... H04B 1/202 348/E5.103
5,689,261 A * 11/1997 Mehta .................... G08C 17/02 341/173
10,454,703 B2 * 10/2019 Shinar ................. H04L 12/2838
2005/0002524 A1 * 1/2005 Hsieh .................... H04L 9/0891 380/31
2006/0145911 A1 * 7/2006 Kim ....................... G08C 17/02 341/176
2006/0161812 A1 * 7/2006 Lee ........................ G08C 19/28 714/18
2007/0103331 A1 * 5/2007 Tseng ..................... G08C 19/28 340/4.31
2010/0314941 A1 * 12/2010 Schulzman ........... F04D 25/068 307/40
2017/0024999 A1 * 1/2017 Hayes .................... G08C 19/28
2020/0396098 A1 * 12/2020 Shinar .................... G08C 23/04

FOREIGN PATENT DOCUMENTS

CN 104837254 A * 8/2015

* cited by examiner

*Primary Examiner* — Adnan Aziz
(74) *Attorney, Agent, or Firm* — Birch, Stewart, Kolasch & Birch, LLC

(57) ABSTRACT

A remote coding setting method is to be implemented by a receiver of a ceiling fan, and includes steps of: (A) when receiving a setting signal during a predetermined time period, obtaining a code length of the setting signal; (B) retrieving, from pre-stored coding data, a piece of coding format information that corresponds to the code length; (C) setting a fan coding format based on the piece of coding format information; and (D) when receiving a control signal after the predetermined time period, decoding the control signal based on the fan coding format, and controlling operation of the ceiling fan based on a result of the decoding.

8 Claims, 4 Drawing Sheets

REMOTE CODING SETTING METHOD AND RECEIVER FOR A CEILING FAN

FIELD

The disclosure relates to a remote coding setting method and a receiver, and more particularly to a remote coding setting method and a receiver for a ceiling fan.

BACKGROUND

Ceiling fans are ventilation and cooling devices commonly found in buildings. Ceiling fans are generally installed on high ceilings and are difficult to reach, so they are usually controlled wirelessly through remote controllers. A code address of a transmitter in the remote controller and a code address of a receiver in the ceiling fan must match before wireless control can be performed for the receiver of the ceiling fan to effectively receive a control signal transmitted by the transmitter of the remote controller and act accordingly.

Conventionally, two dual in-line package (DIP) switches are respectively installed in the transmitter and the receiver, and the DIP switches are set to the same code so as to pair the transmitter and the receiver. However, if the user fails to record the code set in the receiver of the ceiling fan, and accidentally loses the remote controller or sets the DIP switch of the remote controller to a different code, then a professional would need to be called in to remove a housing of the ceiling fan to access the receiver and obtain the code set in the receiver in order to set or reset the code in the transmitter of the remote controller, and then reassemble the ceiling fan. This process consumes not only time but also money.

SUMMARY

Therefore, an object of the disclosure is to provide a remote coding setting method and a receiver that can alleviate at least one drawback of the prior art.

According to an aspect of the disclosure, the remote coding setting method is to be implemented by a receiver of a ceiling fan, and includes steps of: (A) when receiving a setting signal during a predetermined time period, obtaining a code length of the setting signal; (B) retrieving, from pre-stored coding data, a piece of coding format information that corresponds to the code length; (C) setting a fan coding format based on the piece of coding format information; and (D) when receiving a control signal after the predetermined time period, decoding the control signal based on the fan coding format, and controlling operation of the ceiling fan based on a result of the decoding.

According to another aspect of the disclosure, the receiver is to be used in a ceiling fan, and includes a receiver circuit, a memory circuit and a processor. The receiver circuit is configured to receive a setting signal and a control signal. The memory circuit is configured to store coding data that are related to multiple pieces of coding format information respectively corresponding to different code lengths. The processor is configured to perform the aforesaid remote coding setting method.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
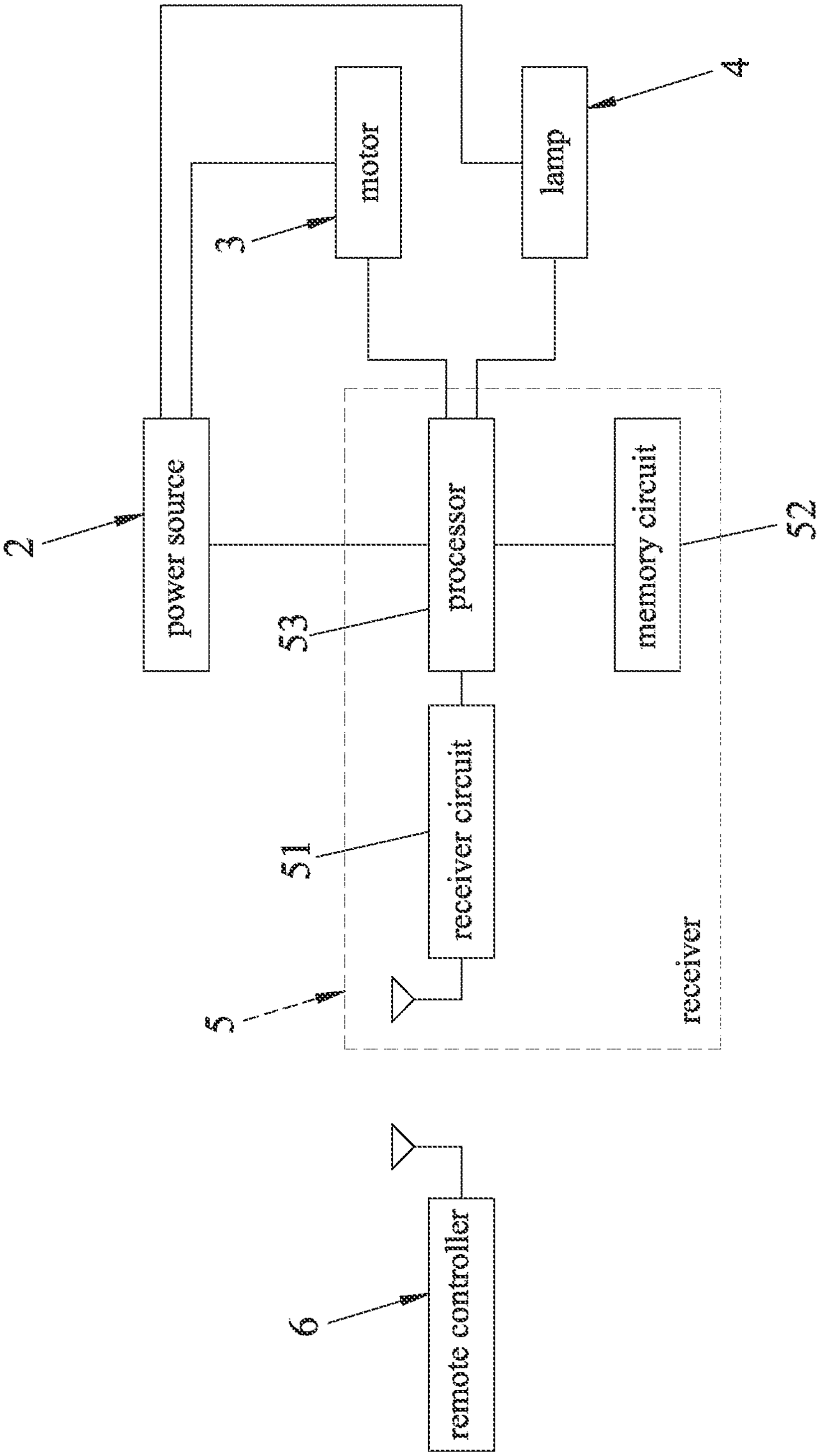
FIG. 1 is a block diagram illustrating an embodiment of a receiver according to the disclosure for a ceiling fan.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a receiver 5 according to the disclosure is to be used in a ceiling fan, and is operatively associated with a remote controller 6. The ceiling fan includes a power source 2, a motor 3, a lamp 4 and a plurality of vanes (not shown).

The power source 2 is configured to receive mains electricity, and to perform voltage stabilization and voltage transformation on the mains electricity so as to generate power that is to be provided to the motor 3, the lamp 4 and the receiver 5.

The receiver 5 includes a receiver circuit 51, a memory circuit 52 and a processor 53.

The receiver circuit 51 is configured to wirelessly receive a setting signal and a control signal that are outputted by the remote controller 6.

The memory circuit 52 is configured to store coding data that are related to multiple pieces of coding format information respectively corresponding to different code lengths. It should be noted that the memory circuit 52 is independent of the processor 53 in this embodiment, but may be built in the processor 53 in other embodiments, depending on application requirements.

The processor 53 is configured to control rotation of the motor 3 (and thus rotation of the vanes), and on/off and brightness of the lamp 4. It should be noted that the motor 3 and the lamp 4 are controlled by the processor 53 in this embodiment, but may be controlled by a controller (not shown) that is independent of the processor 53 in other embodiments, depending on application requirements.

Figure 2:
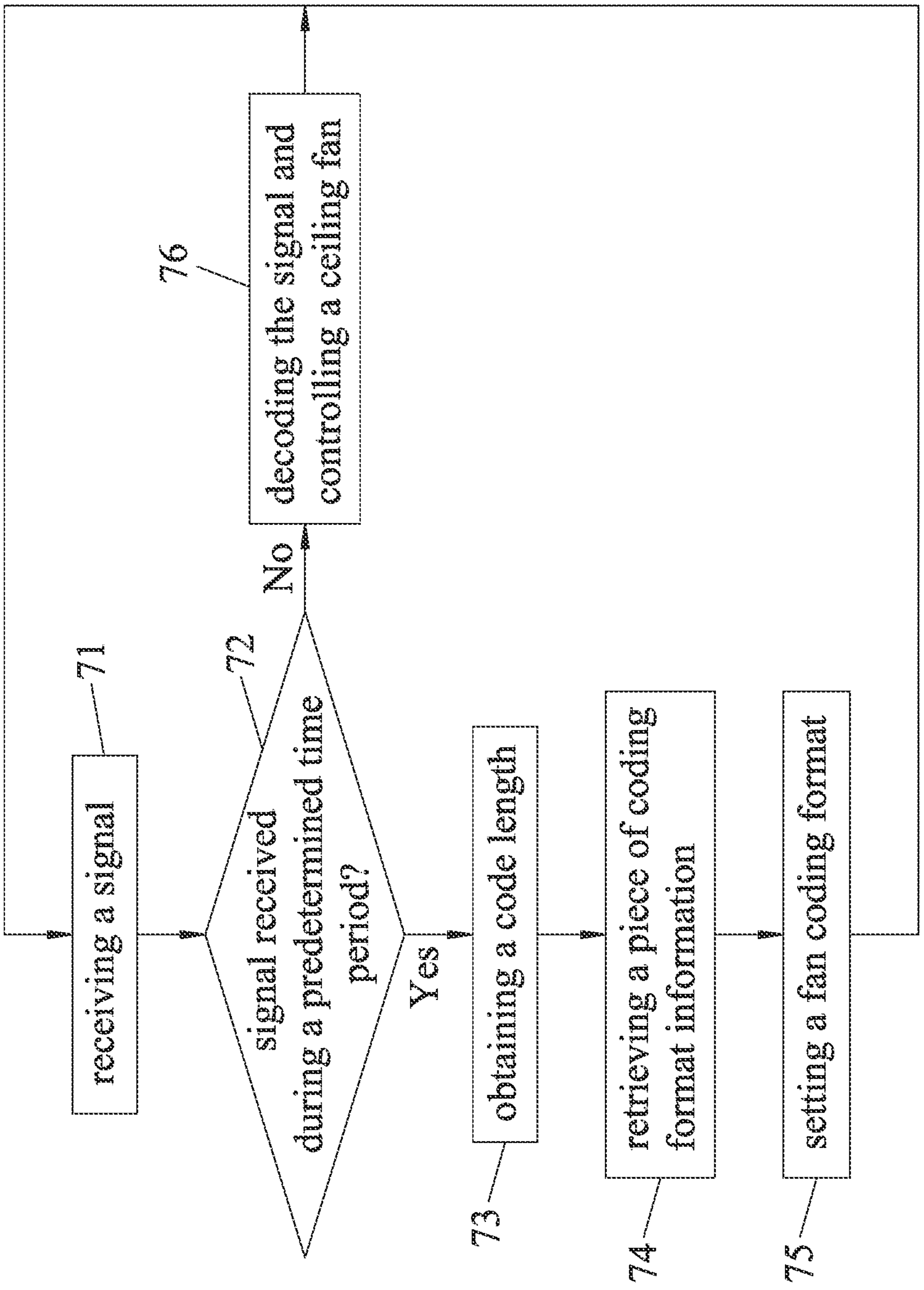
FIG. 2 is a flow chart illustrating a remote coding setting method performed by the embodiment.

Referring to FIGS. 1 and 2, the processor 53 is further configured to perform a remote coding setting method that includes the following steps 71-76.

In step 71, the processor 53 receives an input signal from the remote controller 6 through the receiver circuit 51.

In step 72, the processor 53 determines whether the input signal is received during a predetermined time period. If affirmative, the input signal is determined to be the setting signal, and the flow proceeds to step 73. Otherwise, the input signal is determined to be the control signal, and the flow goes to step 76.

In this embodiment, the predetermined time period counts from when the ceiling fan is started up or when the ceiling fan is powered on. In an example, the predetermined time period is one minute long, and counts from when the ceiling fan is started up; and when a user wishes to set the receiver 5 of the ceiling fan, the user needs to hold down a predetermined button (e.g., a power button) (not shown) on the remote controller 6 for at least a predetermined time interval (e.g., ten seconds) within one minute after the ceiling fan is started up, so that the remote controller 6 outputs the setting signal for receipt by the receiver circuit 51.

In step 73, the processor 53 obtains a code length of the setting signal.

Figure 3:
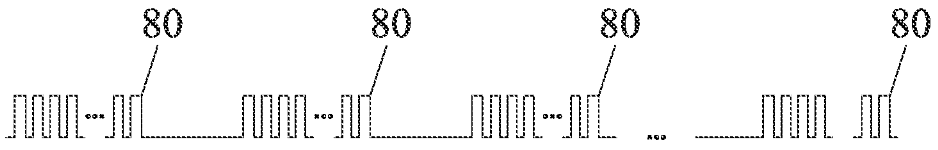
FIG. 3 is a timing diagram illustrating a setting signal received by the embodiment.

Referring to FIGS. 1 and 3, in this embodiment, the setting signal contains a plurality of code strings 80. The code length is a total number of bits in each of the code strings 80. In the aforesaid example, in response to the long press of the predetermined button for at least the predetermined time interval during the predetermined time period, the remote controller 6 outputs at least eight code strings 80, where a total number of the code strings 80 is positively correlated to a length of the time interval for which the predetermined button is pressed. Any two adjacent ones of the code strings 80 are separated by a logic low level that lasts for about 5 ms to about 30 ms.

Figure 4:
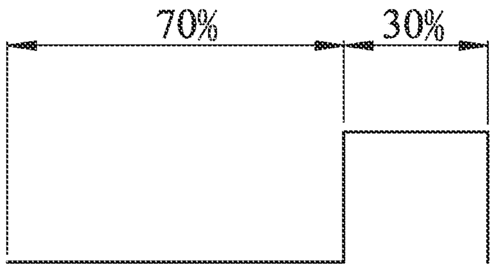
FIGS. 4 and 5 are timing diagrams illustrating bit waveforms of the setting signal.
Figure 5:
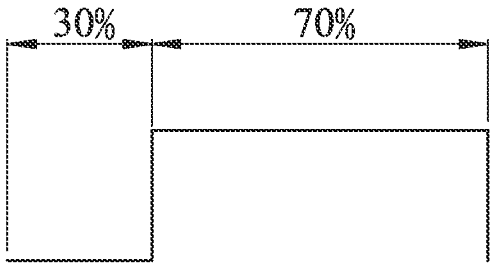

FIG. 4 illustrates a bit waveform that represents a logic value "0," where a low level duration is greater than or equal to 70% of a total duration. FIG. 5 illustrates a bit waveform that represents a logic value "1," where a high level duration is greater than or equal to 70% of the total duration. When the processor 53 recognizes the bit waveform as shown in either of FIGS. 4 and 5 from the signal received thereby, the processor 53 determines that what comes after is the code strings 80, and the processor 53 is able to discriminate one code string 80 from an adjacent code string 80 by the logic low level that separates the two code strings 80.

After the code strings 80 are identified, the processor 53 calculates the total number of bits in each of the code strings 80 so as to obtain the code length.

Referring to FIGS. 1 and 2, in step 74, the processor 53 retrieves, from the coding data pre-stored in the memory circuit 52, a piece of coding format information that corresponds to the code length obtained in step 73.

The coding data are related to multiple pieces of coding format information that respectively correspond to different code lengths. The code lengths of the setting signals for various remote controller manufacturers are different (e.g., 12 bits, 16 bits, 24 bits, etc.), so the different code lengths and the corresponding pieces of coding format information can be stored in the memory circuit 52 in advance, and each piece of coding format information can be retrieved by the processor 53 based on the corresponding code length.

Each piece of coding format information is related to coding formats of the setting signal and the control signal. Depending on different settings of various remote controller manufacturers, the coding formats of the setting signal and the control signal may be the same, or may be different. When the coding formats of the setting signal and the control signal are different, with respect to each of the code lengths, the corresponding piece of coding format information contains the coding format of the setting signal and the coding format of the control signal.

Figure 6:
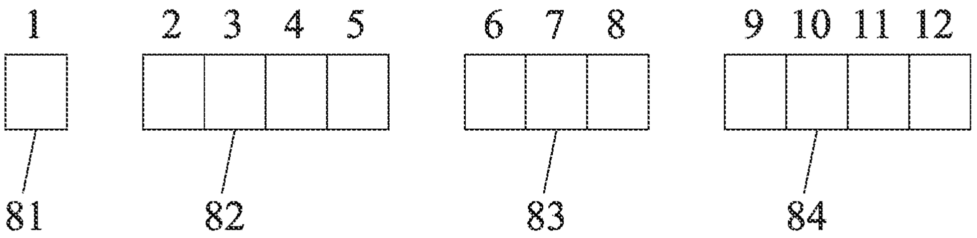
FIG. 6 is a schematic diagram illustrating a coding format of the setting signal.

Referring to FIGS. 3 and 6, each of the code strings 80 of the setting signal at least has an address field 82 and an operation field 84, and may further have a check field 81 and a reserved field 83, depending on application requirements.

In an example shown in FIG. 6, the coding formats of the setting signal and the control signal are the same. The code length of each of the setting signal and the control signal is 12 bits. Each of the code strings 80 (see FIG. 3) of the setting signal and the control signal has the check field 81, the address field 82, the reserved field 83 and the operation field 84, where the check field 81 contains one bit that is assigned bit number 1, the address field 82 contains four bits that are respectively assigned bit numbers 2 to 5, the reversed field 83 contains three bits that are respectively assigned bit numbers 6 to 8, and the operation field 84 contains four bits that are respectively assigned bit numbers 9 to 12. The bit of the check field 81 is calculated based on the bits of the address field 81, the reversed field 83 and the operation field 84, and is used to check the accuracy of the corresponding setting signal or control signal. The bits of the address field 82 represent an address that is assigned to the receiver 5 by the remote controller 6. The bits of the reserved field 83 are reserved for future function expansion of the ceiling fan. The bits of the operation field 84 represent an instruction that corresponds to the operation of the ceiling fan, for example, forward rotation, reverse rotation and rotation speed of the motor 3, brightness of the lamp 4, etc.

Referring back to FIGS. 1 and 2, in step 75, the processor 53 sets a fan coding format based on the piece of coding format information retrieved in step 74. Then, the flow goes back to step 71.

In this embodiment, after the piece of coding format information is retrieved, the processor 53 decodes the setting signal based on the piece of coding format information, determines whether the coding format corresponding to the piece of coding format information is correct (matches the setting signal) based on a result of the decoding, and, when determining that the coding format is correct, stores the coding format as the fan coding format in, for example, the memory circuit 52 or a memory built in the processor 53, for future use. Specially, the processor 53 decodes the code strings 80 (see FIG. 3) of the setting signal, and determines that the coding format is correct when decoding of the code strings 80 (see FIG. 3) result in the same information. Details of the determination should be readily apparent to those skilled in the art from the aforesaid description, and are omitted herein for the sake of brevity.

Optionally, the processor 53 controls the ceiling fan to output a completion indication after setting of the fan coding format is complete, so as to inform the user of the completion of the setting process. For example, the processor 53 may cause the lamp 4 to blink twice, cause a buzzer (not shown) of the ceiling fan to sound, or cause the motor 3 to rotate the vanes for one second.

In step 76, the processor 53 decodes the control signal based on the fan coding format, and controls operation of the ceiling fan based on a result of the decoding. Then, the flow goes back to step 71.

After the completion of the setting process, when the user wants to control the ceiling fan, he/she only needs to operate the remote controller 6 to output the control signal, and the receiver 5 will decode the control signal based on the fan coding format and control operation of the ceiling fan based on the result of the decoding.

In view of the above, the receiver 5 of this embodiment has the following advantages.

1. By virtue of the memory circuit 52 pre-storing the coding data, and by virtue of the processor 53 retrieving, from the coding data, the piece of coding format information that corresponds to the code length of the setting signal wirelessly received through the receiver circuit 51, the receiver 5 can be set wirelessly, thereby facilitating quick setting and saving the time and the expenses required in the conventional setting (e.g., to invite a professional to disassemble and set the ceiling fan when the remote controller is accidentally lost or when the DIP switch on the remote controller is set to codes other than the code of the ceiling fan).

2. Since the piece of coding format information is retrieved from the coding data stored in the memory circuit 52, when the existing coding formats of the remote controllers by various manufacturers are changed or additional coding formats are in use, by virtue of updating the coding data stored in the memory circuit 52, the receiver 5 can operate with remote controllers 6 that use the changed coding formats or the additional coding formats without adding new components to the receiver 5. Therefore, the range of application of the receiver 5 can be expanded without additional cost.

Specifically, the receiver circuit 51 is configured to wirelessly communicate with a server using a wireless communication standard such as Wi-Fi, or wirelessly communicate with an electronic device such as a computer, a mobile phone, etc., using a wireless communication standard such as Wi-Fi, Zigbee, Bluetooth, etc., and the processor 53 receives the code lengths and the coding format information related to the changed coding formats or the additional coding formats from the server or the electronic device through the receiver circuit 51, and updates the coding data stored in the memory circuit 52 based on the code lengths and the coding format information thus received.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A remote coding setting method to be implemented by a receiver of a ceiling fan, and comprising steps of:

(A) when receiving a setting signal during a predetermined time period, obtaining a code length of the setting signal;

(B) retrieving, from pre-stored coding data, a piece of coding format information that corresponds to the code length;

(C) setting a fan coding format based on the piece of coding format information; and (D) when receiving a control signal after the predetermined time period, decoding the control signal based on the fan coding format, and controlling operation of the ceiling fan based on a result of the decoding.

2. The remote coding setting method as claimed in claim 1, wherein:

the setting signal contains a plurality of code strings; and the code length is a total number of bits in each of the code strings.

3. The remote coding setting method as claimed in claim 1, wherein the piece of coding format information is related to coding formats of the setting signal and the control signal.

4. The remote coding setting method as claimed in claim 1, wherein the setting signal at least has an address field and an operation field.

5. The remote coding setting method as claimed in claim 4, wherein the setting signal further has a reserved field.

6. The remote coding setting method as claimed in claim 1, wherein step (C) further includes controlling the ceiling fan to output a completion indication after completion of the setting.

7. The remote coding setting method as claimed in claim 1, wherein the predetermined time period counts from when the ceiling fan is started up or when the ceiling fan is powered on.

8. A receiver to be used in a ceiling fan, and comprising:

a receiver circuit configured to receive a setting signal and a control signal;

a memory circuit configured to store coding data that are related to multiple pieces of coding format information respectively corresponding to different code lengths; and a processor configured to perform a remote coding setting method according to claim 1.

* * * * *